United States Patent [19]
Kobayashi et al.

[11] 3,969,244
[45] July 13, 1976

[54] METHOD OF ADSORBING HEAVY METALS

[75] Inventors: Yoshitaka Kobayashi, Yokohama, Japan; Kinjiro Sugai, deceased, late of Yokohama, Japan; by Katsuno Suqai, legal successor, Yokohama, Japan; by Hajime Sugai, legal successor, Yokohama, Japan; by Minoru Sugai, legal successor, Yokohama, Japan; by Shunji Sugai, legal successor, Yokohama, Japan; by Hiroshi Sugai, legal successor, Yokohama, Japan; Minoru Sugai, Yokohama, Japan

[73] Assignees: Hokuetsu Carbon Industry Co., Ltd; Yoshitaka Kobayashi, both of Yokohama, Japan; part interest to each

[22] Filed: May 12, 1975

[21] Appl. No.: 576,332

Related U.S. Application Data

[60] Continuation of Ser. No. 357,620, May 7, 1973, abandoned, which is a division of Ser. No. 149,772, June 3, 1971, abandoned.

[30] Foreign Application Priority Data

June 9, 1970 Japan.............................. 45-50105
Apr. 9, 1971 Japan.............................. 46-21766

[52] U.S. Cl............................. 210/38 B; 260/69 F
[51] Int. Cl.$^2$............................................ C02B 1/14
[58] Field of Search............... 210/38 B; 260/2.2 C, 260/69 F

[56] References Cited
UNITED STATES PATENTS

| | | | |
|---|---|---|---|
| 2,412,855 | 12/1946 | Auten et al. | 210/38 B |
| 2,692,867 | 10/1954 | Passing et al. | 260/2.2 C |
| 3,196,107 | 7/1965 | Tomic | 210/38 B |
| 3,313,779 | 4/1967 | White | 260/2.2 C |
| 3,755,161 | 8/1973 | Yokota et al. | 210/38 B |

FOREIGN PATENTS OR APPLICATIONS

| | | | |
|---|---|---|---|
| 570,483 | 2/1959 | Canada | 260/2.2 C |

*Primary Examiner*—Charles N. Hart
*Assistant Examiner*—Ivars Cintins
*Attorney, Agent, or Firm*—Hans Berman

[57] ABSTRACT

Particulate polycondensates of thiourea, thiosemicarbazide, or thiocarbazide with aldehydes and phenolic or amine constituents adsorb heavy metals from aqueous solutions of their compounds, also mercury from its vapors.

9 Claims, No Drawings

METHOD OF ADSORBING HEAVY METALS

This application is a continuation of the copending abandoned application Ser. No. 357,620, filed May 7, 1973, which in turn is a division of the abandoned appication Ser. No. 149,772, filed June 3, 1971.

This invention relates to a method of removing heavy metal contaminants from aqueous and gaseous media, and particularly to a method of removing heavy metal ions from aqueous liquids and of removing mercury from gaseous media.

It is known that heavy metal ions can be removed from aqueous liquids by adsorption on certain chelating or ion exchange resins, or on activated carbon. However, the known adsorbents are not selective. The ion exchange resins employed heretofore also adsorb calcium and like non-toxic ions, and the useful life of the known ion exchange resins between regeneration cycles is limited by this fact. Activated carbon similarly adsorbs material other than heavy metals.

It has now been found that copolycondensate resins of thiourea, thiosemicarbazide, or thiocarbazide with aldehydes and phenolic or amine constituents selectively adsorb heavy metals, such as mercury, silver, gold, platinum, palladium, lead, copper, nickel, cobalt, iron, manganese, zinc, cadmium, bismuth, tin and vanadium, when the resins are in the form of particles. Mercury ions in any form are adsorbed, and mercury vapor is adsorbed from a gaseous medium. The heavy metals are completely adsorbed from the aqueous solutions of their salts regardless of concentration. Alkali metal or alkaline earth metal salts simultaneously present do not interfere.

The resins of the invention are readily prepared from commercially available starting materials including at least one sulfur-bearing constituent which is thiourea, thiosemicarbazide, or thiocarbazide, and aldehyde such as formaldehyde, paraldehyde, acetaldehyde, benzaldehyde, or furfural as a crosslinking agent. The aldehyde is employed in an amount of 0.7 to 5 moles per mole of the sulfur-bearing compound. At smaller amounts of aldehyde, the resin is fragile and incompletely cured, and the use of more aldehyde is uneconomical and not beneficial to the quality of the resin. Hydrochloric acid, sodium hydroxide, and ammonia may be employed as condensation promoters, the reaction being carried out at 20° to 100°C.

The resin obtained from the sulfur-bearing compound and the aldehyde adsorbs mercury, silver, copper, and other heavy metals, but it lacks the mechanical strength, thermal and chemical stability that is required in many industrial applications, and is too compact for a high adsorption rate.

It is preferred, therefore, to incorporate another ingredient in the condensate which imparts a three-dimensional network structure to the resin. Such further ingredients include hydroxybenzenes such as phenol, hydroquinone, resorcinol, catechol, pyrogallol, and cresol, and aminobenzenes such as aniline, m-phenylenediamine, and toluidine. The polycondensation of a mixture of the sulfur-bearing compound, a cross-linking aldehyde, and a hydroxybenzene or aminobenzene in an aqueous medium results in the formation of a hydrogel having fine pores so as to form a three-dimensional network of high specific surface area.

The reaction between a sulfur-bearing compound, an aldehyde, and a hydroxybenzene requires 0.2 to 2 moles of the latter and 1 to 15 moles aldehyde per mole sulfur-bearing constituent. Alkaline condensation catalysts are employed. In the production of aminobenzene modified resins, 0.2 to 2 moles of the latter are used together with mineral acids as condensation agents, such as hydrochloric and sulfuric acid. The strongly exothermic condensation reaction should be carried out below the boiling point of the aqueous mixture for good strength of the resin, a temperature of 80°C being representative.

Each of the ingredients may be dissolved in water, and the aqueous solutions may be combined simultaneously. However, the aldehyde may react with the sulfur-bearing compound at a rate different from the reaction rate with the benzene derivative, resulting in a non-uniform gel. It is preferred, therefore, to react the sulfur-bearing compound and the phenol or amine separately with respective portions of the aldehyde, and thereafter to combine the several ingredients before completeing the condensation reaction.

If the condensation reaction produces a unitary solid body, the body may be crushed into granular or powdery particles before hardening is completed. If the reaction is carried out in a two-phase system in which the aqueous mixture of the reactants is suspended by agitation in a hydrophobic organic solvent, such as kerosene, benzene, or trichloroethylene, the resin is directly obtained in the form of small spherical particles. When performed in the presence of a powdery or granular, porous carrier, such as activated carbon, silica gel, or alumina gel, the reaction also yields a suitable adsorbent without requiring comminution.

It is also possible to interrupt the condensation reaction at a stage in which the polymer has a viscosity low enough to permit a porous carrier to be impregnated with 5% to 40% by weight of the partial condensate without completely filling the pores of the carrier, and thereafter to complete the reaction.

A column may be packed in the usual manner with the resin particles or the resin carrying substrate, and the aqueous solution to be stripped of heavy metals may be passed through the column in continuous operation. It is also possible to mix the aqueous liquid to be purified with the adsorbent of the invention in a batch process, as is conventional in itself, until the aqueous phase is free of heavy metals. The time during which contact between the aqueous medium and the adsorbent needs to be maintained depends largely on the metal concentration and on the available surface area of the resin. Under conditions in which an adsorption equilibrium is reached in one hour with resin having a particle size of about 200 mesh, a contact time of 24 hours or more may be needed with resin grains having a diameter of 2 mm. The adsorption rate also increases with the temperature, but the resins tend to disintegrate and to lose their adsorptive power when exposed to temperatures above 120°C for extended periods. It is preferred, therefore, to operate at 10° – 80°C.

The adsorption capacity of the resins varies for many metals with the pH of the aqueous liquid to be purified. The optimum pH values are 2 for platinum, 3.5 for gold, and 9.5 for cadmium and zinc. Mercury and silver are adsorbed over the entire range from pH 2 to pH 10. Certain heavy metals may thus be fractionally adsorbed from their common aqueous solution by sequentially passing the solution over two columns, and by adjusting the pH of the stream between the columns. Thus, a solution of zinc and mercury chlorides may first be stripped of mercury at pH 2, and thereafter completely stripped of zinc at pH 9.5.

Mercury is removed from the vapor phase by adsorption on the resins of the invention.

The heavy metals may be eluted from the resins by means of solutions of mineral acids or complexing agents, such as hydrochloric acid, sulfuric acid, potassium cyanide, EDTA, or ammonia. Zinc, for example, is eluted by means of 0.1 N hydrochloric acid, silver with 6 N nitric or sulfuric acid, cadmium with 1 N potassium cyanide. Zinc and mercury may be eluted fractionally by 0.1 N sulfuric acid and 12 N hydrochloric acid respectively. Mercury may also be recovered by distillation. If the value of the adsorbed metals is high, as in the case of gold, platinum, silver, or palladium, it may be economical to burn or carbonize the resin, and to recover the noble metals.

The following Examples further illustrate the invention.

EXAMPLE 1

Six resins A to F were prepared from formaldehyde, thiourea and/or resorcinol in the mole ratios listed in Table 1. The resorcinol and/or thiourea was first dissolved in water to make a 30% solution, all percentage values being by weight unless stated otherwise. The aqueous solution was adjusted to pH 8 with caustic soda in preparing resins A to E, and to pH 3 with hydrochloric acid for resin F, and formaldehyde was added last in the form of its 37% aqueous solution. The mixture was heated to 60°C and then left to stand for 30 minutes. The condensation product was thoroughly washed with water.

The several resins so obtained were tested for their ability of adsorbing heavy metals by crushing them to 100 mesh or finer, and stirring 0.2 g resin, on a dry basis, into 500 ml 3% aqueous sodium chloride solution containing 15 p.p.m. mercury in the form of mercuric chloride. Stirring was continued for two hours, and the resin thereafter was filtered off. The residual mercury concentration in the filtrate was determined by flameless atomic adsorption. The results appear in Table 1.

TABLE 1

| Resin | Thiourea (mole) | Resorcinol (mole) | Formaldehyde (mole) | Mercury (ppm) |
|---|---|---|---|---|
| A | 0 | 1 | 2 | 13.8 |
| B | 0.5 | 1 | 3 | 0.73 |
| C | 1 | 1 | 4 | 0.002 |
| D | 2 | 1 | 6 | 0.0015 |
| E | 3 | 1 | 8 | 0.003 |
| F | 1 | 0 | 2 | 0.03 |

EXAMPLE 2

Two moles thiourea and one mole resorcinol were dissolved in enough water to produce a 30% solution which was adjusted to pH 8 with sodium hydroxide solution, and mixed with 8 moles formaldehyde in the form of its 37% aqueous solution. The mixture was heated to 40°C for slowly starting the reaction which was continued at 80°C to form a red gel. The gel was crushed to particles of 0.5 to 2 mm which were further held at 90°C for one hour in the presence of 1 N hydrochloric acid to complete the condensation reaction. The product so obtained was washed neutral with water.

It had a particle size of 0.4 – 2 mm, a bulk density of 730 g/liter and contained 65% moisture. It was insoluble in most organic solvents, stable when heated with 12 N hydrochloric acid, and stable in boiling water for 10 hours. When packed in a column to a depth of two meters, it was not damaged by the passage of water at a pressure drop of 5 kg/cm$^2$.

A tube 1 meter long and 3 cm in internal diameter was packed with the particulate resin, and aqueous solutions of the metal salts listed in Table 2 were adjusted to the indicated pH values and passed through the resin column at respective flow rates of 10 liters per hour. The initial concentration of the heavy metals in the salts and the weight of heavy metal adsorbed per liter of resin are also listed. The adsorbed metal was calculated from the known initial concentration and the amount of heavy metal detected in the effluent by atomic absorption.

TABLE 2

| Salt | Metal ppm | pH | Adsorbed metal, g |
|---|---|---|---|
| $HgCl_2$ | 15 | 6.0 | 120 |
| $AgNO_3$ | 5 | 7.0 | 120 |
| $AuCl_3$ | 190 | 3.5 | 135 |
| $H_2PtCl_6$ | 100 | 2.0 | 80 |
| $PdCl_2$ | 100 | 2.0 | 77 |
| $Pb(NO_3)_2$ | 13.2 | 6.4 | 52 |
| $[Cu(NH_3)_6]SO_4$ | 15 | 8.5 | 32 |
| $Ni(NH_4)_2(SO_4)_2$ | 10.6 | 8.5 | 35 |
| $Co(NH_4)_2(SO_4)_2$ | 12 | 8.4 | 28 |
| $ZnCl_2$ | 4.2 | 7.5 | 24 |
| $CdCl_2$ | 4.1 | 8.2 | 25 |
| $FeSO_4$ | 25 | 3.5 | 12 |
| $MnSO_4$ | 5 | 7.0 | 11 |
| $Bi_2(SO_4)_3$ | 5.2 | 9.5 | 22 |
| $SnCl_2$ | 4 | 9.5 | 12 |
| $V_2(SO_4)_3(NH_4)_2SO_4$ | 2.5 | 7.2 | 16 |

EXAMPLE 3

A 30% solution of one mole semithiocarbazide in water was mixed with a 30% solution of formaldehyde. An aqueous 30% solution of resorcinol was adjusted to pH 8.5 with sodium hydroxide solution and mixed with 2 moles formaldehyde in the form of a 37% solution. The second mixture was combined immediately with the semithiocarbazide-formaldehyde mixture that had been prepared 20 minutes earlier. The resulting condensation mixture was poured into benzene kept at 80°C and stirred slowly. Spherical gel particles of pale, yellowish color were formed, filtered from the liquid medium and poured into boiling water to remove adhering benzene.

The particles were packed into a tube of 3 cm inner diameter in an amount of 1 liter, and an aqueous solution containing 5 ppm mercury as mercuric sulfate, 5 ppm silver as silver nitrate, and 3 ppm zinc as zinc sulfate, and adjusted to pH 8.5 with ammonium hydroxide solution was passed through the column at a flow rate of 10 liters per hour.

After 1000 hours of operation, 48 g mercury, 41 g silver, and 20 g zinc were adsorbed on the resin. Elution by means of 0.1 N sulfuric acid released 98% of the adsorbed zinc. An aqueous 10% sodium thiosulfate solution thereafter eluted 87% of the adsorbed silver. Ultimately, 95% of the adsorbed mercury was eluted with 12 N hydrochloric acid.

In a second run under analogous conditions, one liter of the resin was charged with 55 g adsorbed mercury. A mixture of the resin with lime and iron filings was heated to 650°C in a vessel sealed from the atmosphere. The developing vapors were cooled, and 92% of the mercury originally present in the resin was recovered.

What is claimed is:

1. A method of removing a heavy metal from an aqueous solution of a salt of said heavy metal which comprises contacting said solution with a particulate resin, said resin essentially consisting of a polycondensation product of a sulfur-bearing constituent, a hydroxy- or aminobenzene, and an aldehyde, said resin being prepared from 1 to 15 moles of said aldehyde and 0.2 to 2.0 moles of said hydroxy- or aminobenzene per mole of said sulfur-bearing constituent, said sulfur-bearing constituent being thiourea, thiosemicarbazide, or thiocarbazide, and hydroxybenzene being phenol, hydroquinone, resorcinol, catechol, pyrogallol, or cresol, said aminobenzene being aniline, m-phenylenediamine, or toluidine, and said aldehyde being formaldehyde, paraldehyde, acetaldehyde, benzaldehyde, or furfural.

2. A method as set forth in claim 1, wherein said hydroxy- or aminobenzene is resorcinol, and said aldehyde is formaldehyde.

3. A method as set forth in claim 1, wherein said heavy metal is mercury, silver, gold, platinum, palladium, lead, copper, nickel, cobalt, iron, manganese, zinc, cadmium, bismuth, tin, or vanadium.

4. A method as set forth in claim 1, wherein said sulfur-bearing constituent is thiourea.

5. A method as set forth in claim 4, wherein said hydroxy- or aminobenzene is resorcinol.

6. A method as set forth in claim 5, wherein said heavy metal is mercury, silver, gold, platinum, palladium, lead, nickel, cobalt, iron, manganese, zinc, cadmium, bismuth, tin, or vanadium.

7. A method as set forth in claim 1, wherein said sulfur-bearing constituent is thiocarbazide.

8. A method as set forth in claim 7, wherein said hydroxy- or aminobenzene is resorcinol.

9. A method as set forth in claim 8, wherein said heavy metal is mercury, silver, gold, platinum, palladium, lead, nickel, cobalt, iron, manganese, zinc, cadmium, bismuth, tin, or vanadium.

* * * * *